US011340428B2

(12) United States Patent
Liu et al.

(10) Patent No.: US 11,340,428 B2
(45) Date of Patent: May 24, 2022

(54) TELEPHOTO LENS AND MOBILE TERMINAL

(71) Applicant: JIANGXI LIANYI OPTICS CO., LTD., Nanchang (CN)

(72) Inventors: Xuming Liu, Nanchang (CN); Haojie Zeng, Nanchang (CN); Jiyong Zeng, Nanchang (CN)

(73) Assignee: JIANGXI LIANYI OPTICS CO, , LTD., Nanchang (CN)

( * ) Notice: Subject to any disclaimer, the term of this patent is extended or adjusted under 35 U.S.C. 154(b) by 74 days.

(21) Appl. No.: 16/920,362

(22) Filed: Jul. 2, 2020

(65) Prior Publication Data

US 2020/0333561 A1 Oct. 22, 2020

Related U.S. Application Data

(63) Continuation-in-part of application No. PCT/CN2019/127517, filed on Dec. 23, 2019.

(30) Foreign Application Priority Data

Jan. 3, 2019 (CN) ........................ 201910005847.1

(51) Int. Cl.
*G02B 13/00* (2006.01)
*G02B 9/12* (2006.01)
(Continued)

(52) U.S. Cl.
CPC ........... *G02B 13/0035* (2013.01); *G02B 9/12* (2013.01); *G02B 13/006* (2013.01); (Continued)

(58) Field of Classification Search
CPC ...... G02B 13/0035; G02B 9/12; G02B 13/02; G02B 13/006; G02B 13/0065; G03B 17/17
See application file for complete search history.

(56) References Cited

U.S. PATENT DOCUMENTS

2018/0031804 A1 2/2018 Lee
2021/0103124 A1* 4/2021 Chen ...................... G02B 13/18
2021/0349287 A1* 11/2021 Yeh .................... G02B 13/0065

FOREIGN PATENT DOCUMENTS

CN 1769940 A 5/2006
CN 201145765 Y 11/2008
(Continued)

OTHER PUBLICATIONS

Machine translation of Zhan CN 105759399 electronically retrieved from Espacenet Nov. 1, 2021 (Year: 2021).*
(Continued)

*Primary Examiner* — Cara E Rakowski

(57) ABSTRACT

The disclosure provides a telephoto lens and a mobile terminal, form an object side to an imaging surface, sequentially includes: a first lens having a positive refractive power, a second lens having a refractive power, a third lens having a negative refractive power, a flat glass and a filter. An object side surface of the first lens is a convex surface, an image side surface of the third lens is s concave surface. The mobile terminal includes the telephoto lens, an image sensor, a processor and a memory. The image sensor are coupled to the telephoto lens, the two are cooperated to capture images. The processor is configured to process the captured images, and the memory is configured to store the captured images. The telephoto lens and the mobile terminal provided in the disclosure can achieve a higher zoom ratio than the conventional telephoto lens, and better satisfy the requirements of miniaturization and high-definition imaging of electronic products.

20 Claims, 12 Drawing Sheets

(51) Int. Cl.

| | |
|---|---|
| ***H04N 5/225*** | (2006.01) |
| ***G03B 17/17*** | (2021.01) |
| ***G02B 13/02*** | (2006.01) |
| *H04M 1/02* | (2006.01) |

(52) U.S. Cl.
CPC ......... *G02B 13/0065* (2013.01); *G02B 13/02* (2013.01); *G03B 17/17* (2013.01); *H04N 5/2253* (2013.01); *H04M 1/0264* (2013.01)

(56) References Cited

FOREIGN PATENT DOCUMENTS

| | | | | |
|---|---|---|---|---|
| CN | 203480119 | U | | 3/2014 |
| CN | 203838395 | U | | 9/2014 |
| CN | 104977699 | A | | 10/2015 |
| CN | 204833031 | U | | 12/2015 |
| CN | 105759399 | A | * | 7/2016 |
| CN | 206387955 | U | | 8/2017 |
| CN | 109557643 | A | | 4/2019 |
| JP | 2005315904 | A | | 1/2005 |
| TW | 201734557 | A | | 10/2017 |

OTHER PUBLICATIONS

First Office Action issued in corresponding Chinese application No. 201910005847.1, dated Jan. 6, 2020 (12 pages).
Notification to Grant Patent Right for Invention in corresponding Chinese application No. 201910005847.1, dated Apr. 16, 2020 (5 pages).
International Search Report issued in corresponding International application No. PCT/CN2019/127517, dated Mar. 9, 2020 (8 pages).
Written opinion of the International Search Authority in corresponding International application No. PCT/CN2019/127517, dated Mar. 9, 2020 (6 pages).

* cited by examiner

TELEPHOTO LENS AND MOBILE TERMINAL

CROSS REFERENCE TO RELATED APPLICATION(S)

This application is a continuation-in-part of PCT Application Serial No. PCT/CN2019/127517, filed on Dec. 23, 2019, which entitled "TELEPHOTO LENS AND MOBILE TERMINAL". The PCT application claims priority to a Chinese application No. 2019100058471, filed on Jan. 3, 2019, titled "TELEPHOTO LENS AND MOBILE TERMINAL". The entirety of the above-mentioned applications is hereby incorporated by reference herein.

TECHNICAL FIELD

The present disclosure relates to the field of optical lens technologies, and more particularly, to a telephoto lens, a camera module and a mobile terminal.

BACKGROUND

In recent years, with the pursuit of the imaging quality of portable electronic products, dual cameras have become the standard equipment for mobile phone products. In order to achieve high-quality imaging effect, most mobile phones use a solution of "fixed-focus dual-camera", which is a combination of a wide-angle lens and a telephoto lens, therefore the mobile phone can not only perform wide-angle shooting, but also enlarge the scene clearly when shooting in the distance, so that the mobile phone can have a good shooting effect similar to that of signal lens reflex cameras.

In the conventional dual-camera products, the equivalent focal length ratio of the telephoto lens and the wide-angle lens is between 3 and 5 times, and the zoom ratio can reach 3 to 5 times when the two are used in combination. The zoom ratio is too small compared with the traditional zoom lens, so it is difficult to meet the requirements of miniaturization and high-definition imaging of portable electronic products.

SUMMARY

The objects of the disclosure are to provide a telephoto lens, a camera module and a mobile terminal to solve the above problems.

The embodiments of the present disclosure achieve the above objects through the following technical solutions.

In a first aspect, the present disclosure provides a telephoto lens. From an object side to an imaging surface, the telephoto lens sequentially includes: a first lens having a positive refractive power, a second lens having a refractive power, a third lens having a negative refractive power, a flat glass and a filter. An object side surface of the first lens is a convex surface, an image side surface of the third lens is a concave surface.

In a second aspect, the present disclosure provides a camera module. The camera module includes a telephoto lens and an image sensor coupled to the telephoto lens, the image sensor is disposed on an imaging surface of the telephoto lens and configured to receive optical signals output by the telephoto lens and form electrical signals corresponding to the optical signals.

In a third aspect, the present disclosure provides a mobile terminal, which includes a camera module as mentioned above, a processor and a memory, wherein the camera module is configured to capture images, the processor is configured to process the captured images, and the memory is configured to store the captured images.

Compared with the related art, the telephoto lens, the camera module and the mobile terminal provided by the disclosure can achieve a higher zoom ratio. The equivalent focal length of the telephoto lens provided by the disclosure and the conventional wide-angle lens is more than 8 times, that is, the telephoto lens provided by the disclosure can achieve zooming of more than 8 times when used in combination with the conventional wide-angle lens, thereby better satisfying the requirements of miniaturization and high-definition imaging of electronic products.

The advantages of the present disclosure will be partially given in the following description, and some will become apparent from the following description, or be learned through the practice of the present disclosure.

REFERENCE NUMERALS OF MAIN COMPONENTS

Figure 1:
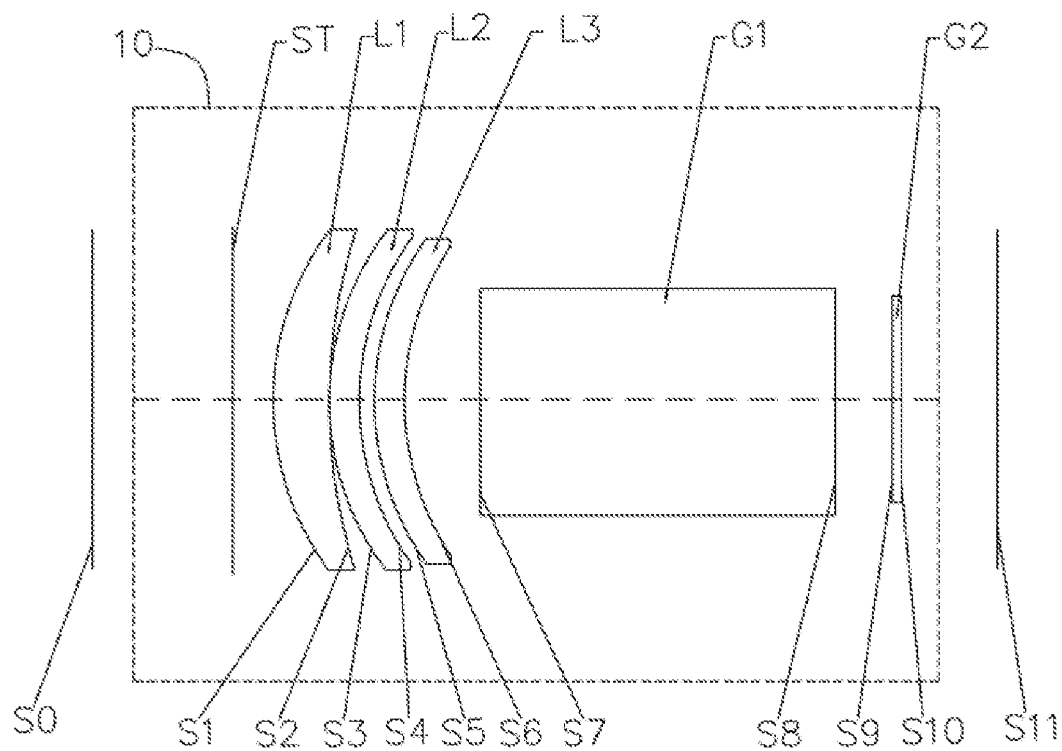
FIG. 1 is a schematic structural diagram of a telephoto lens in a first embodiment of the disclosure.

| | | | |
|---|---|---|---|
| Stop | ST | First lens | L1 |
| Second lens | L2 | Third lens | L3 |
| Flat glass | G1 | Filter | G2 |
| Camera module | 100 | Mobile terminal | 200 |
| Housing | 201 | Rear cover | 2011 |
| Processor | 210 | Memory | 220 |
| Image sensor | 50 | Prism | 60 |
| First prism | 61 | Second prism | 62 |
| Incident surface | 601 | Emitting surface | 602 |
| Reflective surface | 603 | Telephoto lens | 10 |

The following embodiments will further illustrate the present disclosure with reference to the above drawings.

DETAILED DESCRIPTION OF PREFERRED EMBODIMENTS

In order to facilitate a better understanding of the present disclosure, the present disclosure will be further explained below with reference to the accompanying drawings. The embodiments of the present disclosure are shown in the drawings, but the present disclosure is not limited to the above-mentioned preferred embodiments. Rather, these embodiments are provided to make the disclosure of the present disclosure more sufficient.

The embodiment of the present disclosure provides a telephoto lens. Form an object side to an imaging surface, the telephoto lens sequentially includes: a first lens having a positive refractive power, a second lens having a refractive power, a third lens having a negative refractive power, a flat glass, and a filter. The first lens, the second lens, and the third lens form a lens group. An object side surface of the first lens is a convex surface, an image side surface of the third lens is a concave surface. The flat glass has a relatively high refractive index and provides a relatively long optical path length. The lens group and the flat glass are configured to refract lights and form optical images.

In some embodiments, the telephoto lens meets the expression: $0.75<TTL/f<2.0$; where TTL represents a total optical lens of the telephoto lens, f represents a focal length of the telephoto lens. Satisfying the above expression can effectively shorten the total optical length of the telephoto lens and promote the miniaturization of the telephoto lens.

In some embodiments, the flat glass meets the expression: $N_{d4}>1.8$ where $N_{d4}$ represents a refractive index of the flat glass. The flat glass uses a material with high refractive index to facilitate the incidence of the light.

In some embodiments, the first lens is made of glass. Due to the temperature resistance of the glass material is better and the performance is more stable, the first lens is made of glass material, which can effectively achieve the effect of thermalization for the telephoto lens.

In some embodiments, the telephoto lens meets the expression: $3<f/R_1<5$; where f represents a focal length of the telephoto lens, $R_1$ represents a radius of curvature of the object side surface of the first lens. When the value of $f/R_1$ exceeds the lower limit, the refractive power of the first lens becomes larger, which is not conducive to ensuring the peripheral performance, and the eccentric sensitivity becomes larger.

When the value of $f/R_1$ exceeds the upper limit, it is difficult to correct the chromatic aberration of the telephoto lens.

In some embodiments, the telephoto lens meets the expression: $1<R_1/R_6<2$; where $R_1$ represents a radius of curvature of the object side surface of the first lens, $R_6$ represents a radius of curvature of the image side surface of the third lens. Satisfying the above expression can effectively improve the resolution of the margin field of the telephoto lens.

In some embodiments, the telephoto lens meets the expression: $-5<f_2/f_1<5$; where $f_1$ represents a focal length of the first lens, $f_2$ represents a focal length of the second lens. When the value of $f_2/f_1$ exceeds the lower limit, the refractive power and the eccentric sensitivity becomes larger; when the value of $f_2/f_1$ exceeds the upper limit, the refractive power becomes smaller, which is not conducive to maintaining miniaturization.

In some embodiments, the telephoto lens meets the expression: $-1<f_3/f<0$; where $f_3$ represents a focal length of the third lens, f represents a focal length of the telephoto lens. When the value of $f_3/f$ exceeds the lower limit, high-order aberration will occur for off-axis lights, and the performance of the telephoto will deteriorate; when the value of $f_3$If exceeds the upper limit, it is relatively difficult to correct the field curvature and the coma, and the eccentric sensitivity becomes larger.

In some embodiments, the telephoto lens meets the expression: $-2<(R_3+R_4)/(R_3-R_4)<5$; where $R_3$ represents a radius of curvature of the object side surface of the second lens, $R_4$ represents a radius of curvature of the image side surface of the second lens. When the value of $(R_3+R_4)/(R_3-R_4)$ exceeds the upper limit, the field curvature and the distortion increase excessively in the positive direction, and are difficult to correct. Conversely, when the value of $(R_3+R_4)/(R_3-R_4)$ exceeds the lower limit, the field curvature and the distortion increase excessively in the negative direction, and also are difficult to correct.

In some embodiments, the telephoto lens meets the expression: $-2<R_4/f_2<3$; where $R_4$ represents a radius of curvature of the image side surface of the second lens, $f_2$ represents a focal length of the second lens. When the value of $R_4/f_2$ exceeds the lower limit, the refractive power of the image side surface of the second lens becomes larger, which is not conducive to ensure the peripheral performance, and the eccentric sensitivity becomes larger; when the value of $R_4/f_2$ exceeds the upper limit, it is difficult to correct the field curvature.

In some embodiments, at least one of the object side surface of the first lens, an image side surface of the first lens, an object side surface of the second lens, an image side surface of the second lens, an object side surface of the third lens, and the image side surface of the third lens is a aspheric surface. A stop is disposed between the object side and the first lens. Aspheric surface can make the telephoto lens have more control variables to reduce aberration.

In some embodiments, the first lens and the second lens are cemented into a cemented doublet.

In some embodiments, the telephoto lens meets the expressions: $CT_3<CT_1$; $CT_1+CT_2+CT_3<T_G$; where $CT_1$ represents a center thickness of the first lens, $CT_2$ represents a center thickness of the second lens, $CT_3$ represents a center thickness of the third lens. $T_G$ represents a center thickness of the flat glass.

In some embodiments, the telephoto lens meets the expressions: $D_{12}<D_{3G}$; $D_{23}<D_{3G}$; where $D_{12}$ represents a distance between the first lens and the second lens on the optical axis, $D_{3G}$ represents a distance between the flat glass and the third lens on the optical axis, $D_{23}$ represents a distance between the second lens and the third lens on the optical axis.

In some embodiments, the telephoto lens meets the expression: f≥31 mm; where f represents a focal length of the telephoto lens.

The embodiment of the present disclosure further provides a mobile terminal. The mobile terminal includes the telephoto lens as mentioned in any above embodiments, the mobile terminal further includes an image sensor, the image sensor is disposed on the imaging surface of the telephoto lens and configured to receive optical signals output by the telephoto lens and form electrical signals corresponding to the optical signals.

The shapes of aspheric surfaces of the optical lens provided by the embodiments of the present disclosure satisfy the following equation:

$$z = \frac{ch^2}{1+\sqrt{1-(1+k)c^2h^2}} + Bh^4 + Ch^6 + Dh^8 + Eh^{10} + Fh^{12} + Gh^{14} + Hh^{16},$$

where z represents a vector height between a position on the surface and a vertex of the surface along an optical axis of the lens, c represents a curvature of the vertex of the surface, K is a quadratic surface coefficient, h is a distance between the position on the surface and the optical axis, B is a fourth order surface coefficient, C is a sixth order surface coefficient, D is an eighth order surface coefficient, E is a tenth order surface coefficient, F is a twelfth order surface coefficient, G is a fourteenth order surface coefficient. H is a sixteenth order surface coefficient.

Compared with a conventional telephoto lens, the telephoto lens provided by the present disclosure can achieve a higher zoom ratio. The zoom ratio refers to the ratio of the equivalent focal length of the telephoto lens to the equivalent focal length of the wide-angle lens under the premise of the same pixels. Equivalent focal length=actual focal length*focal length conversion factor; focal length conversion factor=43.3/the diagonal length of the target surface of the image sensor.

The equivalent focal length of the telephoto lens provided by the disclosure and the conventional wide-angle lens is more than 8 times, that is, the telephoto lens provided by the disclosure can achieve zooming of more than 8 times when used in combination with the conventional wide-angle lens, thereby better satisfying the requirements of miniaturization and high-definition imaging of electronic products.

The present disclosure will be further described in the following multiple embodiments. In each of the following embodiments, the thickness and radius of curvature of each lens in the telephoto lens are different. For specific differences, refer to the parameter table in each embodiment.

First Embodiment

Please refer to FIG. 1, which is a structural diagram of a telephoto lens 10 provided in a first embodiment of the disclosure. From an object side to an imaging surface thereof, the telephoto lens 10 sequentially includes a stop ST, a first lens L1, a second lens L2, a third lens L3, a flat glass G1 and a filter G2.

The first lens L1 has a positive refractive power, an object side surface S1 of the first lens L1 is a convex surface and an image side surface S2 of the first lens L1 is a concave surface. The first lens is made of glass, and the object side surface S1 of the first lens L1 and the image side surface S2 of the first lens L1 are both aspheric surfaces. The second lens L2 has a positive refractive power, an object side surface S3 of the second lens L2 is a convex surface, an image side surface S4 of the second lens L2 is a concave surface. The third lens L3 has a negative refractive power, an object side surface S5 of the third lens L3 is a convex surface, an image side surface S6 of the third lens L3 is a concave surface. The first lens L1, the second lens L2, and the third lens L3 form a lens group. The flat glass G1 has a relatively high refractive index and provides a relatively long optical path length. The lens group and the flat glass G1 are configured to refract lights and form optical images.

Related parameters of each lens in the telephoto lens 10 provided by the first lens are shown in Table 1.

TABLE 1

| Surface NO. | Sign | Surface type | Radius of curvature | Thickness | Refractive index | Abbe number |
|---|---|---|---|---|---|---|
| S0 | | Flat surface | — | | | |
| ST | Stop | Flat surface | — | −1.498 | | |
| S1 | First lens L1 | Aspheric surface | 7.130 | 1.317 | 1.808 | 40.921 |
| S2 | | Aspheric surface | 9.529 | 0.139 | | |
| S3 | Second lens L2 | Spherical surface | 10.321 | 1.363 | 1.697 | 56.200 |
| S4 | | Spherical surface | 44.119 | 0.048 | | |
| S5 | Third lens L3 | Spherical surface | 9.711 | 0.497 | 1.805 | 25.477 |
| S6 | | Spherical surface | 5.265 | 10.000 | | |
| S7 | Flat glass G1 | Flat surface | — | 13.000 | 1.901 | 37.054 |
| S8 | | Flat surface | — | 0.200 | | |
| S9 | Filter G2 | Flat surface | — | 0.210 | 1.517 | 64.212 |
| S10 | | Flat surface | — | 7.272 | | |
| S11 | Imaging surface | Flat surface | — | — | | |

The parameters of the aspheric surfaces of the first lens of this embodiment are shown in Table 2.

TABLE 2

| Surface NO. | k | $A_4$ | $A_6$ | $A_8$ | $A_{10}$ | $A_{12}$ | $A_{14}$ | $A_{16}$ |
|---|---|---|---|---|---|---|---|---|
| S1 | −0.399 | 1.70E−05 | 3.53E−06 | −1.21E−06 | 1.13E−07 | −6.39E−09 | 1.87E−10 | −2.38E−12 |
| S2 | 0 | 7.18E−07 | −4.44E−06 | −1.18E−07 | −3.40E−09 | 2.77E−10 | −1.33E−11 | 0.00E+00 |

Figure 2:
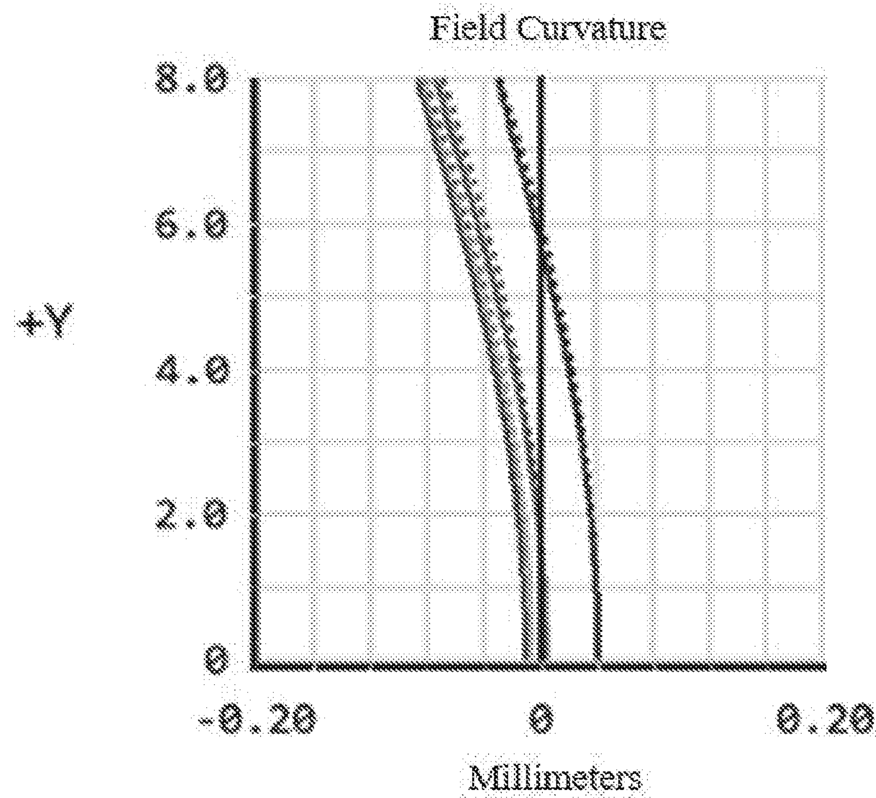
FIG. 2 is a diagram showing field curvature curves of the telephoto lens in the first embodiment of the disclosure.
Figure 3:
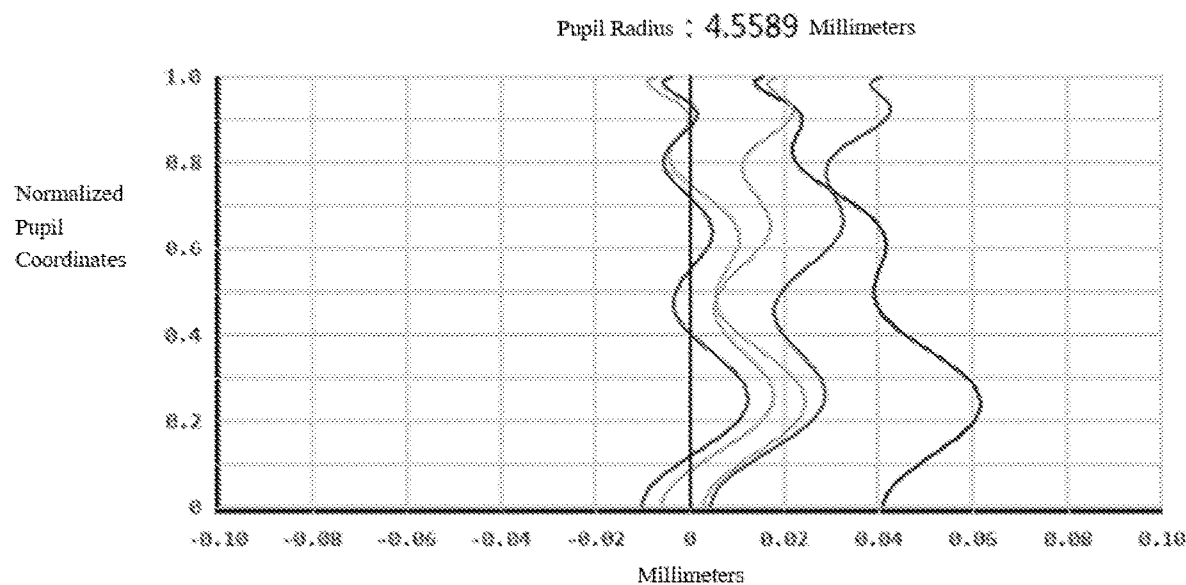
FIG. 3 is a diagram showing axial spherical aberration curves of the telephoto lens in the first embodiment of the disclosure.
Figure 4:
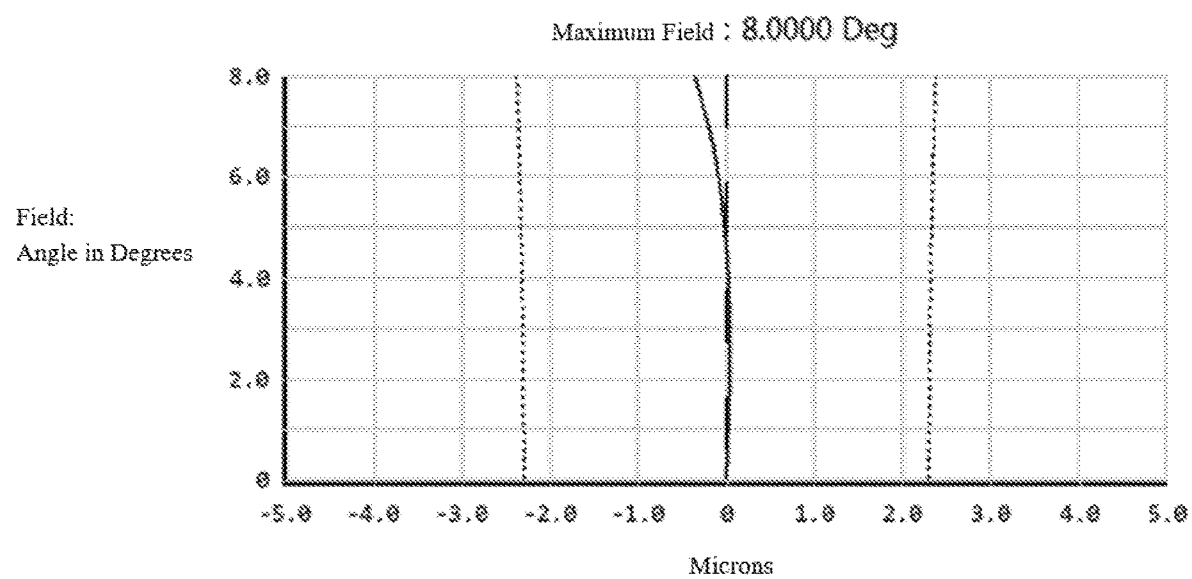
FIG. 4 is a diagram showing lateral chromatic aberration curves of the telephoto lens in the first embodiment of the disclosure.

FIG. 2 shows field curvature curves of the telephoto lens 10 in this embodiment, FIG. 3 shows axial spherical aberration curves of the telephoto lens 10 in this embodiment, FIG. 4 shows lateral chromatic aberration curves of the telephoto lens 10 in this embodiment. As can be seen from the figures, the field curvature, the axial spherical aberration, the lateral chromatic aberration and the distortion of the telephoto lens 10 of this embodiment are all corrected well.

Second Embodiment

Figure 5:
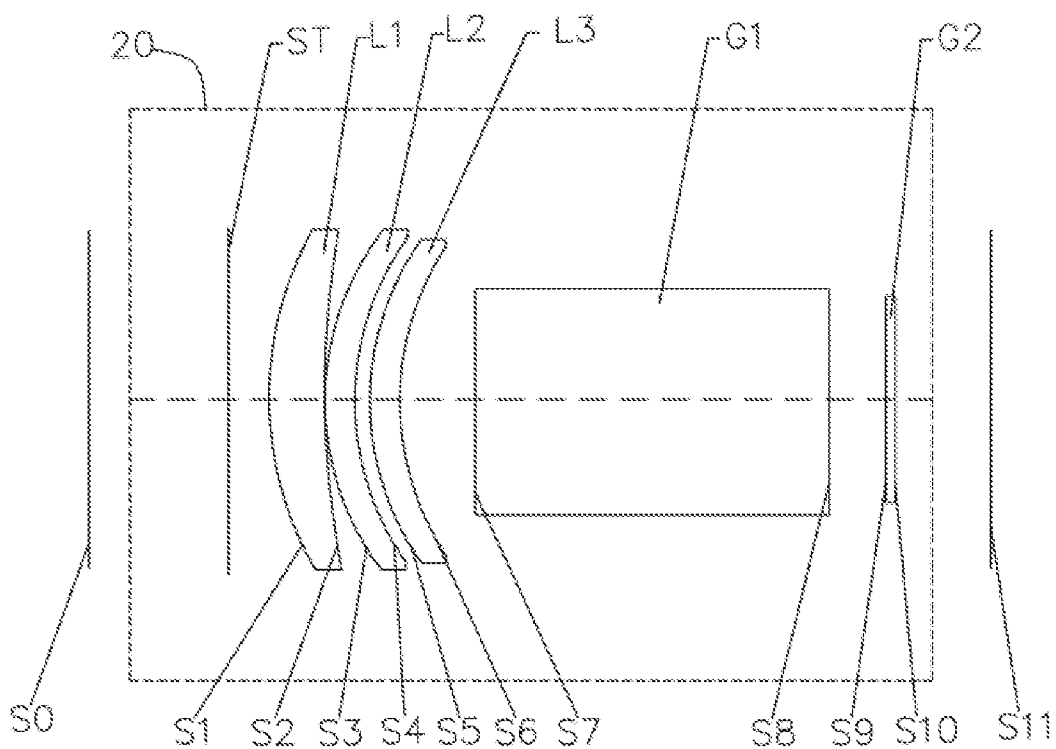
FIG. 5 is a schematic structural diagram of a telephoto lens in a second embodiment of the disclosure.

Please refer to FIG. 5, which is a structural diagram of a telephoto lens 20 provided in this embodiment. The telephoto lens 20 in this embodiment is substantially similar to the telephoto lens 10 in the first embodiment expect that: a second lens L2 of the telephoto lens 20 has a negative refractive power, an object side surface S3 of the second lens L2 and an image side surface S4 of the second lens L2 are both aspheric surface, and the radius of curvature and the materials of each lens are different. Related parameters of each lens are shown in Table 3,

TABLE 3

| Surface NO. | Sign | Surface type | Radius of curvature | Thickness | Refractive index | Abbe number |
|---|---|---|---|---|---|---|
| S0 | | Flat surface | — | | | |
| ST | Stop | Flat surface | — | −1.345 | | |
| S1 | First lens L1 | Aspheric surface | 7.796 | 1.711 | 1.773 | 49.503 |
| S2 | | Aspheric surface | 43.597 | 0.041 | | |
| S3 | Second lens L2 | Aspheric surface | 15.694 | 0.446 | 1.544 | 55.951 |
| S4 | | Aspheric surface | 8.683 | 0.541 | | |
| S5 | Third lens L3 | Spherical surface | 7.595 | 0.488 | 1.946 | 17.944 |
| S6 | | Spherical surface | 5.705 | 10.000 | | |
| S7 | Flat glass G1 | Flat surface | — | 13.000 | 1.901 | 37.054 |
| S8 | | Flat surface | — | 0.200 | | |
| S9 | Filter G2 | Flat surface | — | 0.210 | 1.517 | 64.212 |
| S10 | | Flat surface | — | 7.456 | | |
| S11 | Imaging surface | Flat surface | — | — | | |

The parameters of the aspheric surfaces of the lenses of this embodiment are shown in Table 4.

TABLE 4

| Surface NO. | k | $A_4$ | $A_6$ | $A_8$ | $A_{10}$ | $A_{12}$ | $A_{14}$ | $A_{16}$ |
|---|---|---|---|---|---|---|---|---|
| S1 | −0.416 | 2.77E−05 | 1.31E−05 | −1.46E−06 | 1.10E−07 | −6.10E−09 | 1.20E−10 | −8.29E−13 |
| S2 | 0.000 | 1.67E−03 | −6.09E−05 | −2.20E−07 | 8.60E−09 | 0.00E+00 | 0.00E+00 | 0.00E+00 |
| S3 | 9.782 | 2.24E−03 | −1.30E−05 | 0.00E+00 | 0.00E+00 | 0.00E+00 | 0.00E+00 | 0.00E+00 |
| S4 | 1.954 | −1.64E−04 | 9.74E−05 | 0.00E+00 | 0.00E+00 | 0.00E+00 | 0.00E+00 | 0.00E+00 |

Figure 6:
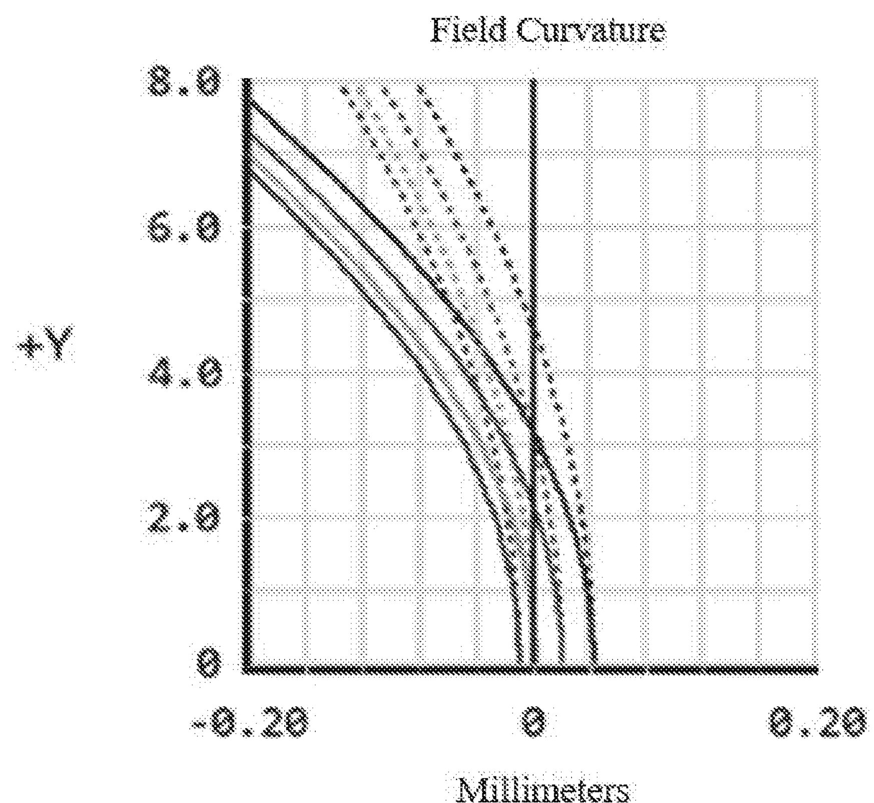
FIG. 6 is a diagram showing field curvature curves of the telephoto lens in the second embodiment of the disclosure.
Figure 7:
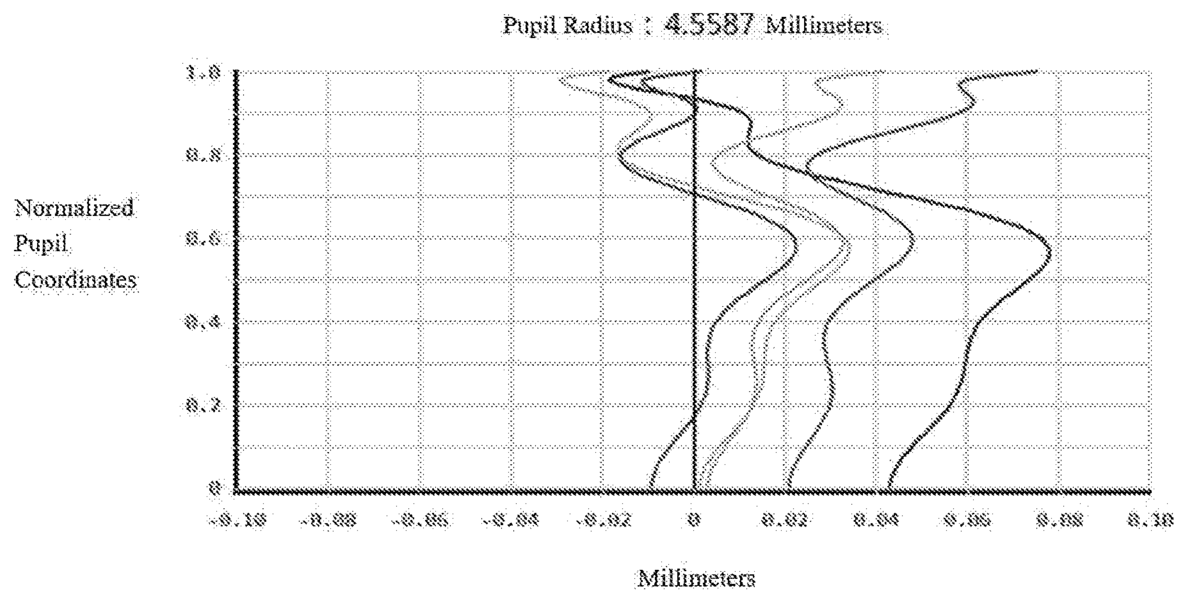
FIG. 7 is a diagram showing axial spherical aberration curves of the telephoto lens in the second embodiment of the disclosure.
Figure 8:
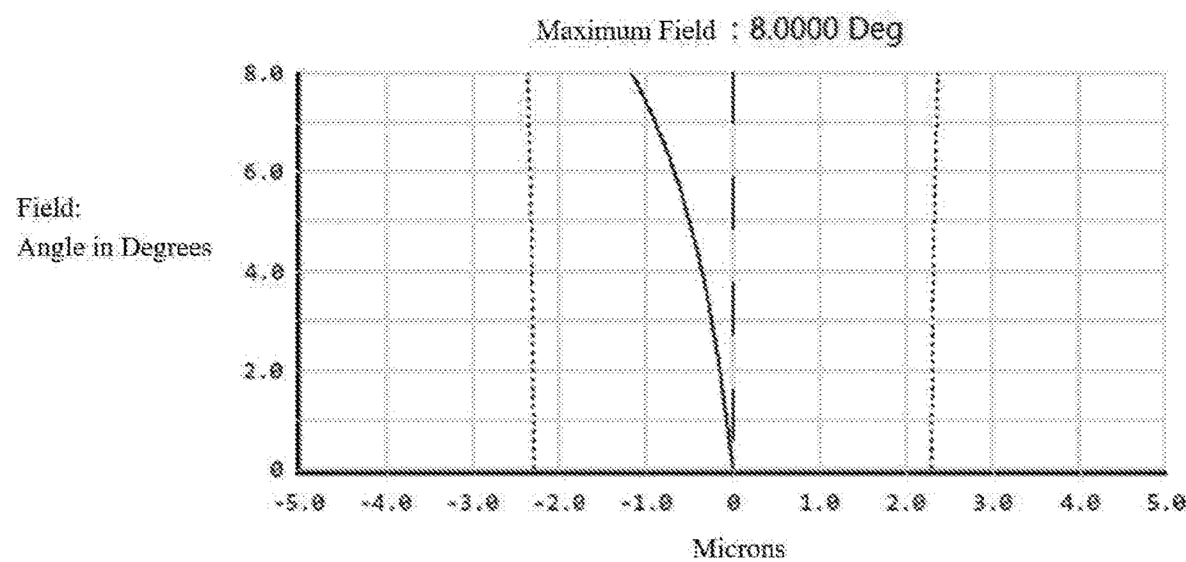
FIG. 8 is a diagram showing lateral chromatic aberration curves of the telephoto lens in the second embodiment of the disclosure.

FIG. 6 shows field curvature curves of the telephoto lens 20 in this embodiment, FIG. 7 shows axial spherical aberration curves of the telephoto lens 20 in this embodiment, FIG. 8 shows lateral chromatic aberration curves of the telephoto lens 20 in this embodiment. As can be seen from the figures, the field curvature, the axial spherical aberration, the lateral chromatic aberration, and the distortion of the telephoto lens 20 of this embodiment are all corrected well.

Third Embodiment

Figure 9:
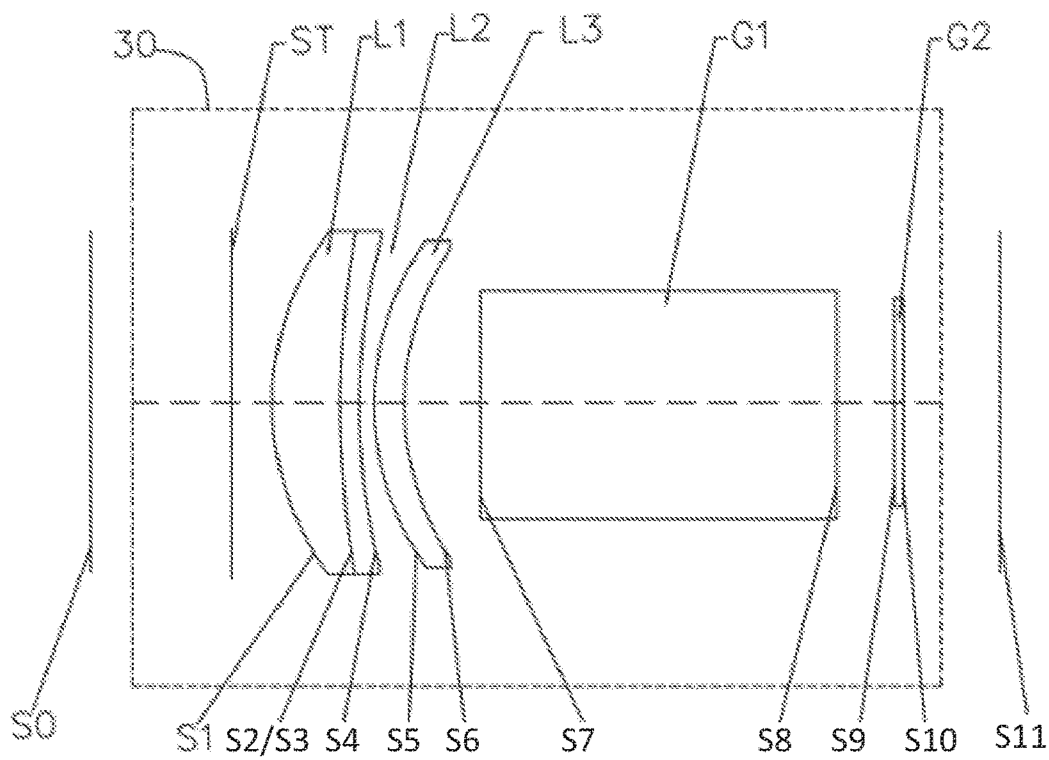
FIG. 9 is a schematic structural diagram of a telephoto lens in a third embodiment of the disclosure.

Please refer to FIG. 9, which is a structural diagram of a telephoto lens 30 provided in this embodiment. The telephoto lens 30 in this embodiment is substantially similar to the telephoto lens 10 in the first embodiment expect that: a first lens L1 and a second lens L2 of the telephoto lens 30 form a cemented lens, the second lens L2 has a negative refractive power, and the radius of curvature and the materials of each lens are different. Related parameters of each lens are shown in Table 5.

TABLE 5

| Surface NO. | Sign | Surface type | Radius of curvature | Thickness | Refractive index | Abbe number |
|---|---|---|---|---|---|---|
| S0 | | Flat surface | — | | | |
| ST | Stop | Flat surface | — | −1.462 | | |
| S1 | First lens L1 | Aspheric surface | 7.530 | 2.023 | 1.773 | 49.503 |
| S2 | | Spherical surface | 39.522 | 0 | | |
| S3 | Second lens L2 | Spherical surface | 39.522 | 0.441 | 1.648 | 33.842 |
| S4 | | Spherical surface | 23.101 | 0.452 | | |
| S5 | Third lens L3 | Spherical surface | 8.710 | 0.471 | 1.805 | 25.477 |
| S6 | | Spherical surface | 5.270 | 10.000 | | |
| S7 | Flat glass G1 | Flat surface | — | 13.000 | 1.901 | 37.054 |
| S8 | | Flat surface | — | 0.200 | | |
| S9 | Filter G2 | Flat surface | — | 0.210 | 1.517 | 64.212 |
| S10 | | Flat surface | — | 7.153 | | |
| S11 | Imaging surface | Flat surface | — | — | | |

The parameters of the aspheric surfaces of the lenses of this embodiment are shown in Table 6.

TABLE 6

| Surface NO. | k | $A_4$ | $A_6$ | $A_8$ | $A_{10}$ | $A_{12}$ | $A_{14}$ | $A_{16}$ |
|---|---|---|---|---|---|---|---|---|
| S1 | −0.197 | −5.81E−05 | 1.08E−05 | −1.68E−06 | 1.42E−07 | −6.81E−09 | 1.72E−10 | −1.76E−12 |

Figure 10:
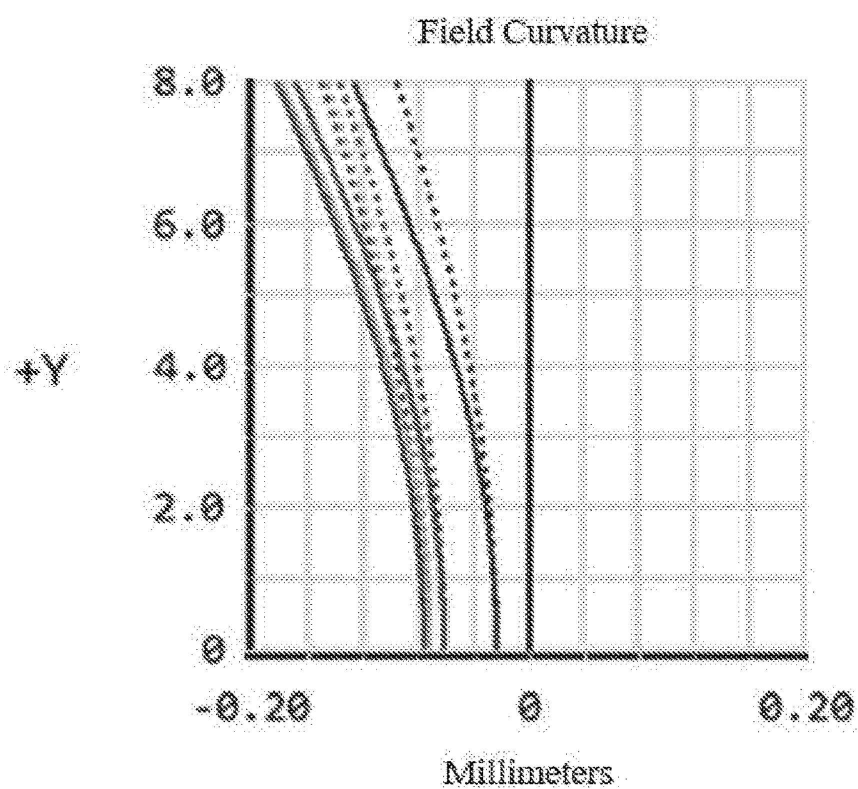
FIG. 10 is a diagram showing field curvature curves of the telephoto lens in the third embodiment of the disclosure.
Figure 11:
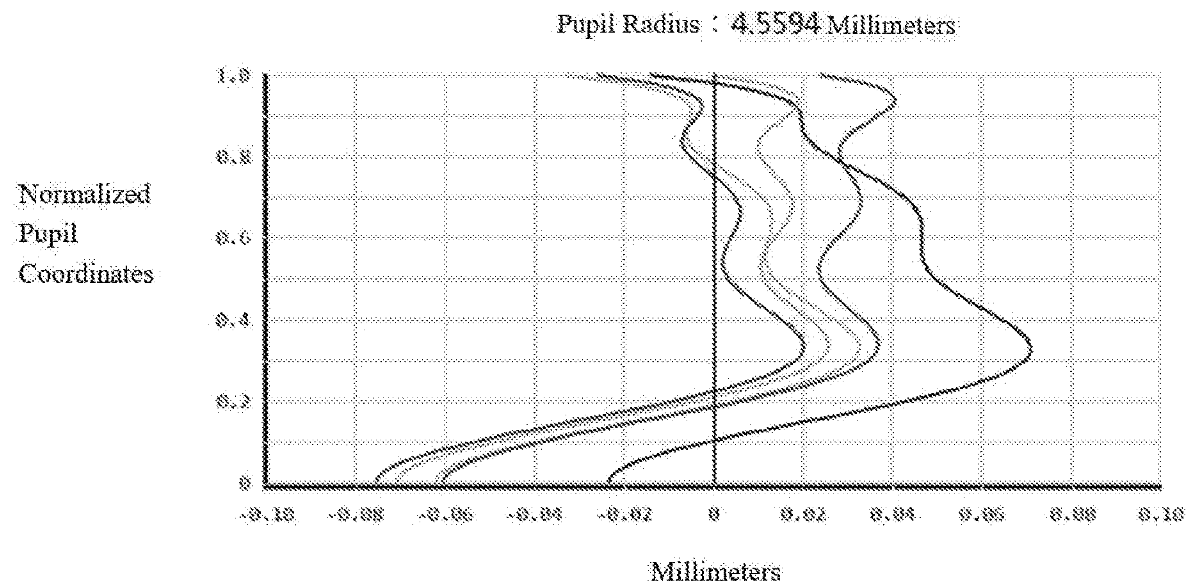
FIG. 11 is a diagram showing axial spherical aberration curves of the telephoto lens in the third embodiment of the disclosure.
Figure 12:
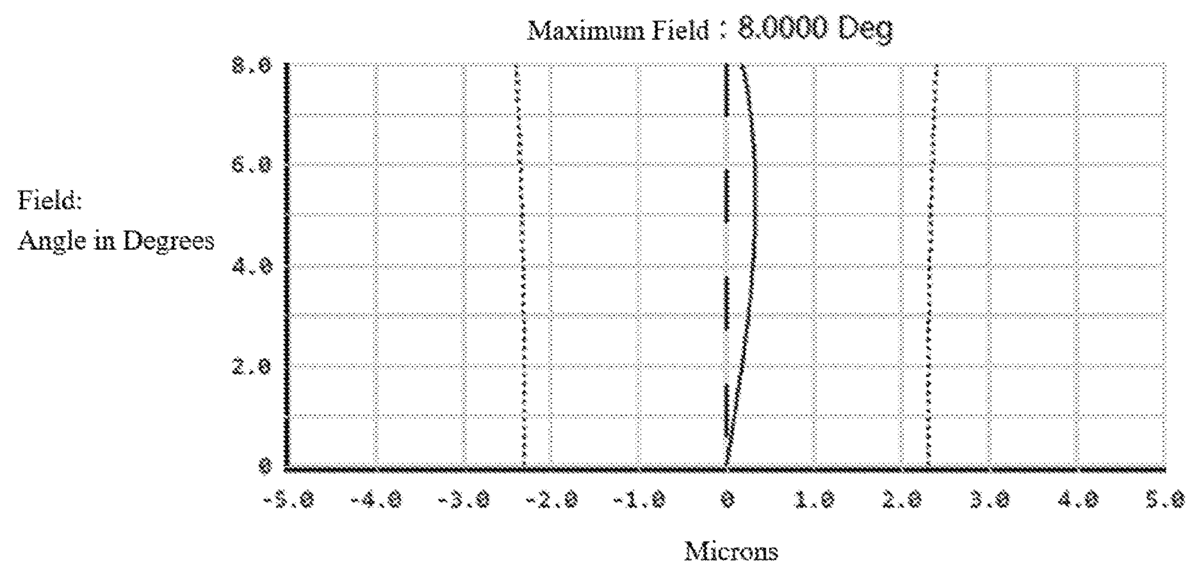
FIG. 12 is a diagram showing lateral chromatic aberration curves of the telephoto lens in the third embodiment of the disclosure.

FIG. 10 shows field curvature curves of the telephoto lens 30 in this embodiment, FIG. 11 shows axial spherical aberration curves of the telephoto lens 30 in this embodiment, FIG. 12 shows lateral chromatic aberration curves of the lateral chromatic aberration of the telephoto lens 30 in this embodiment. As can be seen from the figures, the field curvature, the axial spherical aberration, the lateral chromatic aberration and the distortion of the telephoto lens 30 of this embodiment are all corrected well.

Fourth Embodiment

Figure 13:
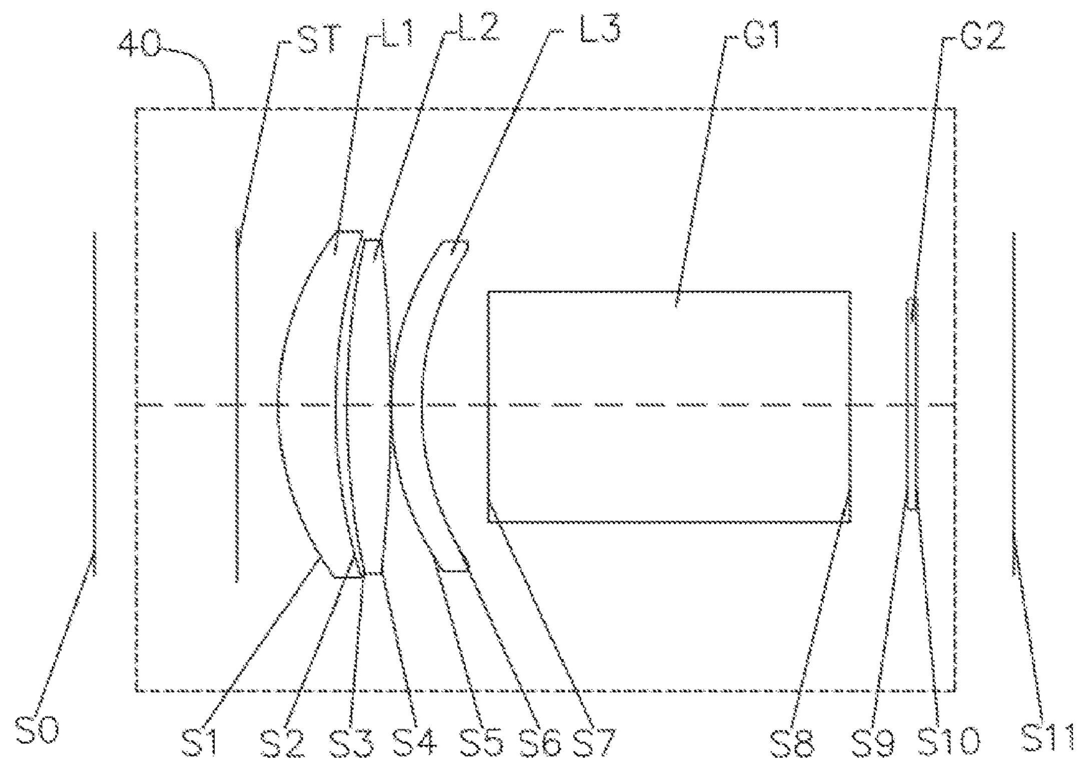
FIG. 13 is a schematic structural diagram of a telephoto lens in a fourth embodiment of the disclosure.

Please refer to FIG. 13, which is a structural diagram of a telephoto lens 40 provided in this embodiment. The telephoto lens 40 in this embodiment is substantially similar to the telephoto lens 10 in the first embodiment expect that: an image side surface of a second lens L2 of the telephoto lens 40 is a convex surface, and the radius of curvature and the materials of each lens are different. Related parameters of each lens are shown in Table 7.

TABLE 7

| Surface NO. | Sign | Surface type | Radius of curvature | Thickness | Refractive index | Abbe number |
|---|---|---|---|---|---|---|
| S0 | | Flat surface | — | | | |
| ST | Stop | Flat surface | — | −1.462 | | |
| S1 | First lens L1 | Aspheric surface | 7.344 | 1.746 | 1.768 | 49.647 |
| S2 | | Aspheric surface | 19.649 | 0.327 | | |
| S3 | Second lens L2 | Spherical surface | 48.985 | 0.902 | 1.603 | 65.460 |
| S4 | | Spherical surface | −110.657 | 0.046 | | |
| S5 | Third lens L3 | Spherical surface | 11.239 | 0.509 | 1.741 | 27.762 |
| S6 | | Spherical surface | 5.432 | 10.000 | | |
| S7 | Flat glass G1 | Flat surface | — | 13.000 | 1.901 | 37.054 |
| S8 | | Flat surface | — | 0.200 | | |
| S9 | Filter G2 | Flat surface | — | 0.210 | 1.517 | 64.212 |
| S10 | | Flat surface | — | 7.134 | | |
| S11 | Imaging surface | Flat surface | — | — | | |

The parameters of the aspheric surfaces of the lenses of this embodiment are shown in Table 8.

TABLE 8

| Surface NO. | k | $A_4$ | $A_6$ | $A_8$ | $A_{10}$ | $A_{12}$ | $A_{14}$ | $A_{16}$ |
|---|---|---|---|---|---|---|---|---|
| S1 | −0.685 | 1.56E−04 | −4.92E−06 | 1.08E−07 | 1.20E−08 | −1.50E−09 | 5.86E−11 | −1.39E−12 |
| S2 | 1.454 | 7.57E−05 | −1.06E−05 | 3.36E−07 | 7.07E−09 | −1.24E−09 | 1.12E−11 | 0.00E+00 |

Figure 14:
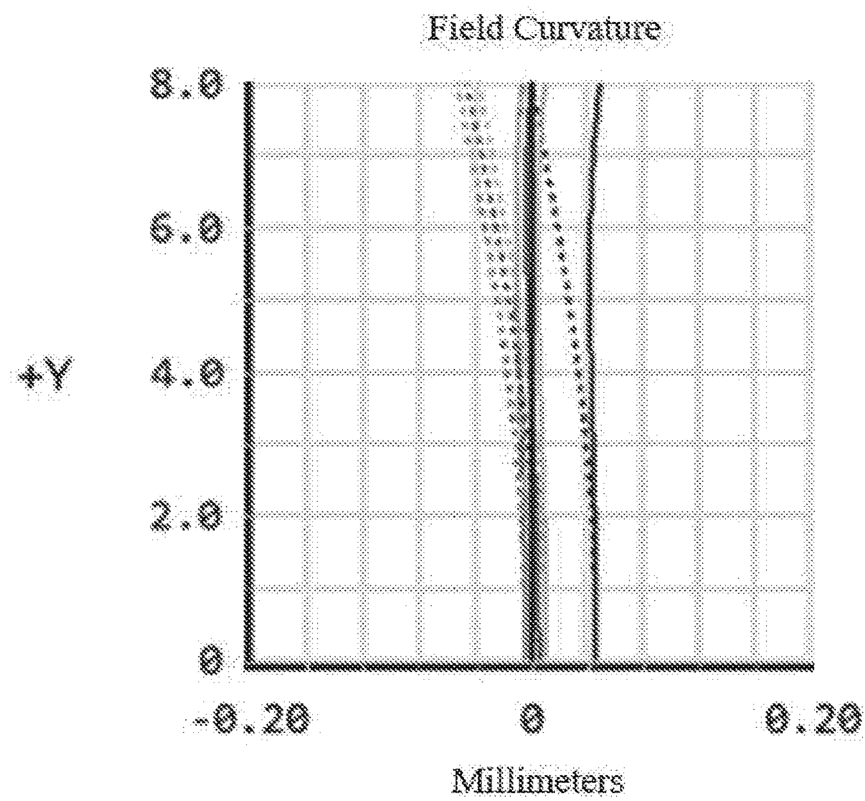
FIG. 14 is a diagram showing field curvature curves of the telephoto lens in the fourth embodiment of the disclosure.
Figure 15:
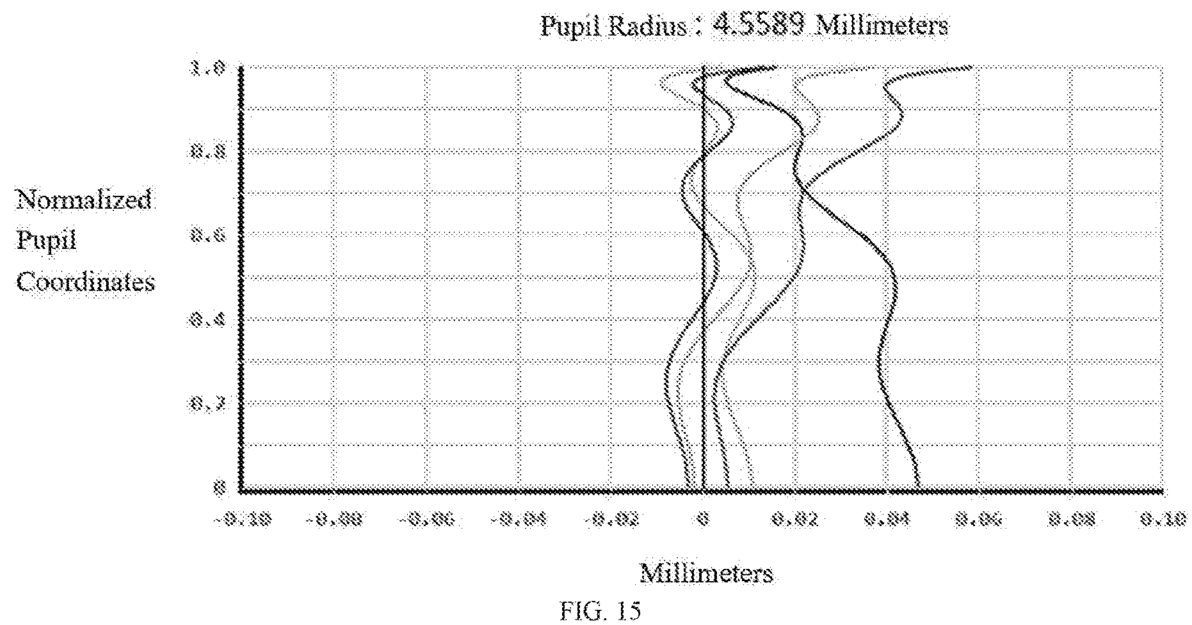
FIG. 15 is a diagram showing axial spherical aberration curves of the telephoto lens in the fourth embodiment of the disclosure.
Figure 16:
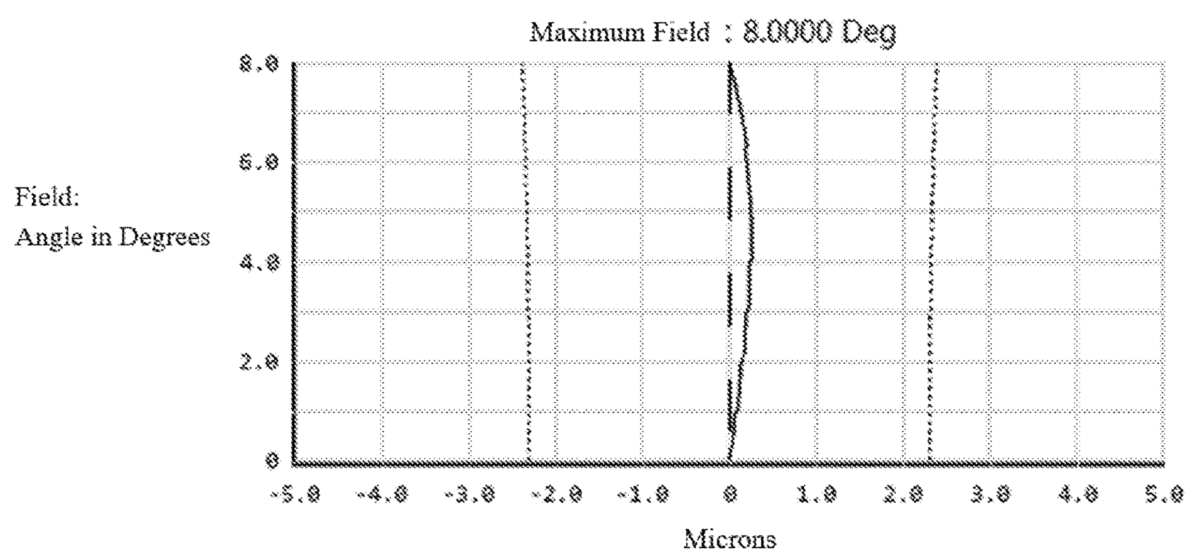
FIG. 16 is a diagram showing lateral chromatic aberration curves of the telephoto lens in the fourth embodiment of the disclosure.

FIG. 14 shows field curvature curves of the telephoto lens 40 in this embodiment, FIG. 15 shows axial spherical aberration curves of the telephoto lens 40 in this embodiment, FIG. 16 shows lateral chromatic aberration curves of the telephoto lens 40 in this embodiment. As can be seen from the figures, the field curvature, the axial spherical aberration, the lateral chromatic aberration and the distortion of the telephoto lens 40 of this embodiment are all corrected well.

Table 9 shows the optical characteristics corresponding to the telephoto lens in the above four embodiments, including the total optical length TTL, the focal length f, the aperture number F #, and the field angle 2θ, and the value corresponding to each of the above conditional expression.

TABLE 9

| Condition | First embodiment | Second embodiment | Third embodiment | Fourth embodiment |
|---|---|---|---|---|
| TTL | 34.045 | 34.093 | 33.950 | 34.075 |
| f | 31.000 | 31.000 | 31.004 | 31.000 |
| F# | 3.6 | 3.6 | 3.6 | 3.6 |
| 2θ | 8° | 8° | 8° | 8° |
| TTL/f | 1.098 | 1.100 | 1.095 | 1.099 |
| $f/R_1$ | 4.348 | 3.976 | 4.117 | 4.221 |
| $R_1/R_6$ | 1.354 | 1.367 | 1.429 | 1.352 |
| $f_2/f_1$ | 0.677 | −3.037 | −3.196 | 3.929 |
| $f_3/f$ | −0.481 | −0.886 | −0.565 | −0.473 |
| $(R_3 + R_4)/(R_3 - R_4)$ | −1.611 | 3.477 | 3.814 | −0.386 |
| $R_4/f_2$ | 2.327 | −0.238 | −0.724 | −1.966 |

The total optical length of the telephoto lens provided by the disclosure exceeds 30 mm, which is far more than the thickness of a mobile phone. When the telephoto lens is used in a mobile phone, the lens can be designed as a periscope lens imaging system using a reflective optical surface, which is embedded in the mobile phone to meet the requirements of thin and light electronics product.

The focal length of the telephoto lens provided by the disclosure can reach 31 mm, and the diagonal length of the image sensor matched with the telephoto lens is 5 mm. By using the calculation method of equivalent focal length, the follows can be obtained: (1) a focal length conversion factor=43.3/a diagonal length of a target surface of the image sensor=43.3/5=8.66; (2) an equivalent focal length actual focal length*focal length conversion factor=31*8.66=268.46 mm. Therefore, the equivalent focal length of the telephoto lens provided by the disclosure can reach 268 mm. Generally, the equivalent focal length of a conventional wide-angle lens is usually 20~30 mm. When the telephoto lens provided by the disclosure is used in combination with a conventional wide-angle lens, the equivalent focal length ratio of the two is more than 8 times, that is, the telephoto lens provided by the disclosure can achieve zooming of more than 8 times when used in combination with the conventional wide-angle lens, thereby having better zoom imaging effects to satisfy the requirements of miniaturization and high-definition imaging of electronic products.

Fifth Embodiment

Figure 17:
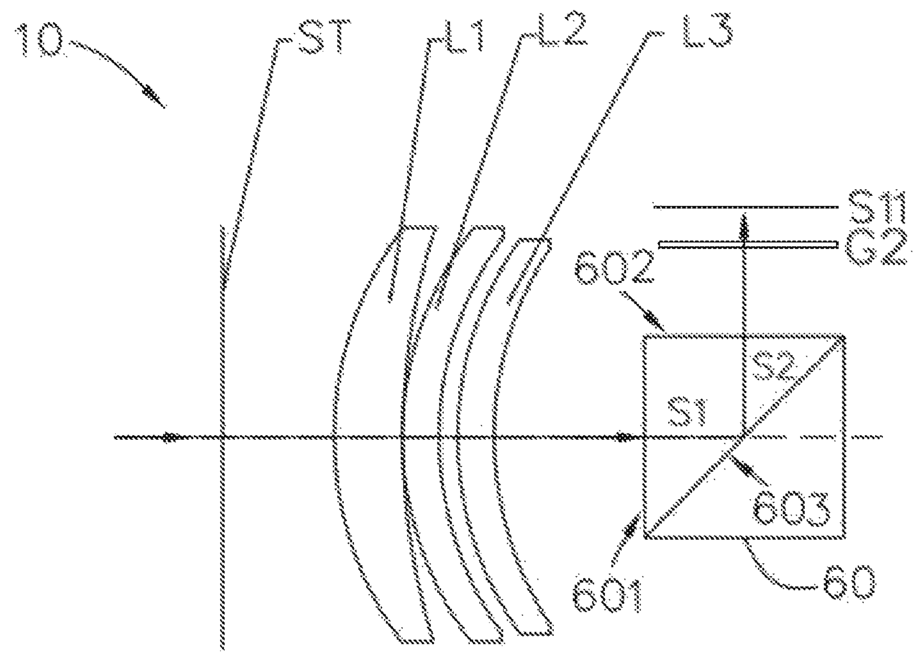
FIG. 17 is a schematic structural diagram of a telephoto lens in a fifth embodiment of the disclosure.

Please refer to FIG. 17, the disclosure further provides a telephoto lens 10, which includes a stop ST, a first lens L1, a second lens L2, a third lens L3, and a prism 60. The first lens L1, the second lens L2, and the third lens L3 form a lens group, the lens group may be the same as any lens group of the foregoing embodiments. In other words, the first lens L1, the second lens L2, and the third lens L3 have the same structure as that of the foregoing embodiments.

The prism 60 includes an incident surface 601, an emitting surface 602 and a reflective surface 603. The incident surface 601 is perpendicular to the emitting surface 602, the reflective surface 603 is inclined with respect to both of the incident surface 601 and the emitting surface 602. For example, an included-angle between the reflective surface 603 and the incident surface 601 is 45 degrees, an included-angle between the reflective surface 603 and the emitting surface 602 is also 45 degrees, so an optical path of the telephoto lens 10 is redirected by the prism 60. In other words, the lights are incident to the first lens L1, passes through the second lens L2 and the third lens L3, then the lights are incident into the prism 60 from the incident surface 601, redirected and reflected by the reflective surface 603, and finally emitted from the emitting surface 602 along a direction perpendicular to an optical axis of the lens group.

In other embodiments, the included-angle between the reflective surface 603 and the incident surface 601 may be 30 degrees, 40 degrees, or any other appropriate degrees according to required optical paths.

The telephoto lens 10 meets the expression: $CT_1+CT_2+CT_3<S1+S2$; where $CT_1$ represents a center thickness of the first lens L1. $CT_2$ represents a center thickness of the second lens L2. $CT_3$ represents a center thickness of the third lens L3, S1 represents a path length from the incident surface 601 to the reflective surface 603, S2 represents a path length from the reflective surface 603 to the emitting surface 602.

The telephoto lens 10 meets the expression: $N_{dp}>1.8$, where $N_{dp}$ represents a refractive index of the prism 60.

The prism 60 has a relatively high refractive index and provides a relatively long optical path length. The lens group and the prism 60 are configured to refract lights and form optical images. Therefore, a focal length of the telephoto lens 10 may be equal to or larger than 31 mm.

The telephoto lens 10 may further includes a filter G2, which is opposite and parallel to the emitting surface 602. The prism 60 is disposed between the filter G2 and the third lens L3.

The telephoto lens 10 also meets the other expressions as that described in any one of the above embodiments.

In particular, the telephoto lens 10 meets the expression: $S1+S2=T_G$, where S1 represents a path length from the incident surface 601 to the reflective surface 603, S2 represents a path length from the reflective surface 603 to the emitting surface 602, $T_G$ represents a center thickness of the flat glass G1 of any of the first to the fourth embodiments. In other words, a path length of the telephoto lens 10 in the first embodiment is equal to a path length of the telephoto lens 10 in the fifth embodiment. The prism 60 has a relatively high refractive index and provides a relatively long optical path length, it not only refracts incident lights for imaging, but also redirects the incident lights, thereby changing a location of an imaging surface S11. In the foregoing embodiments, the imaging surface S11 is substantially perpendicular to the optical axis of the lens group; in the fifth embodiment, the imaging surface S11 is substantially parallel to the optical axis of the lens group.

Sixth Embodiment

Figure 18:
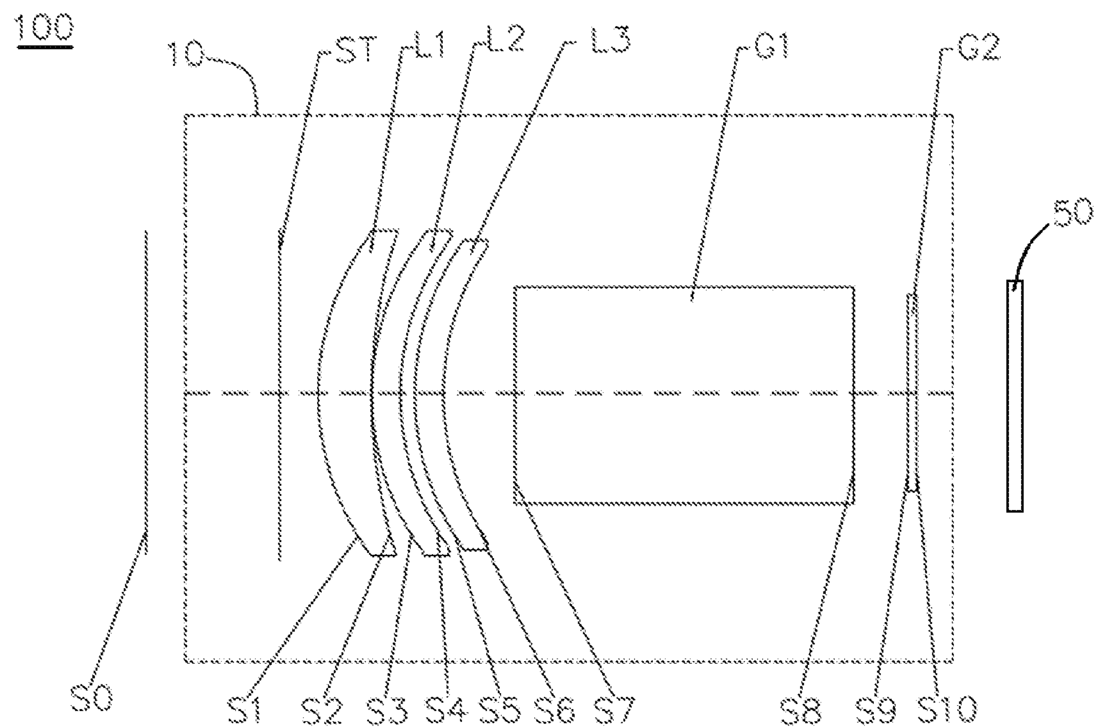
FIG. 18 a schematic structural diagram of a camera module in a sixth embodiment of the disclosure.

Please refer to FIG. 18, which is a structural diagram of a camera module 100 provided in this embodiment. The camera module 100 includes the telephoto lens 10 of the first embodiment and an image sensor 50 coupled to the telephoto lens 10. The image sensor 50 may be disposed on the imaging surface S11 of the telephoto lens 10, and configured to receive optical signals output by the telephoto lens 10 and form electrical signals corresponding to the optical signals. The image sensor 50 may be a Complementary Metal Oxide Semiconductor (CMOS) image sensor, or a Charge Coupled Device (CCD) image sensor.

Seventh Embodiment

Figure 19:
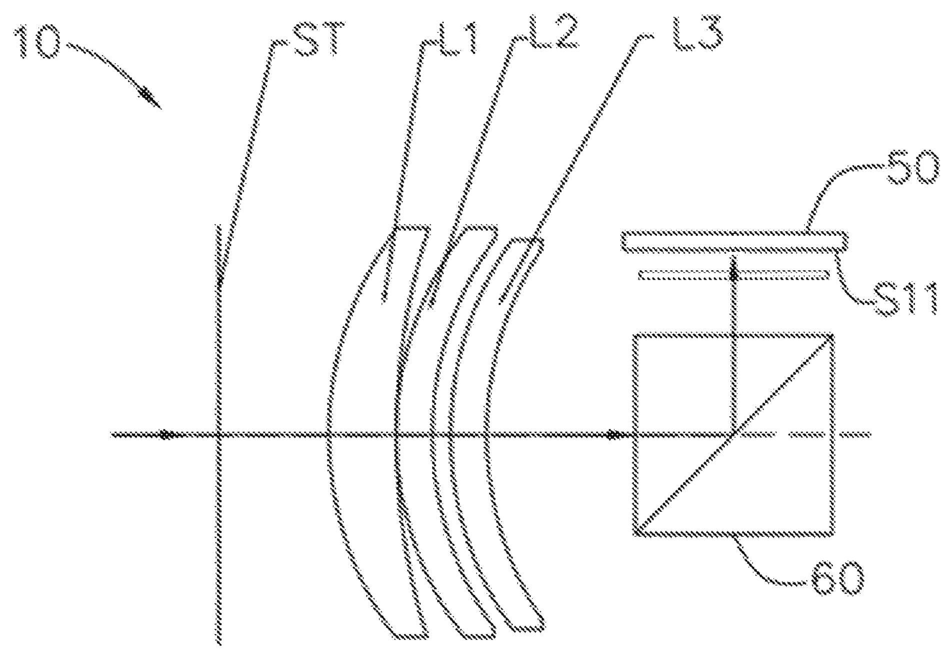
FIG. 19 a schematic structural diagram of a camera module in a seventh embodiment of the disclosure.

Referring to FIG. 19, a camera module 100 provided in this embodiment includes the telephoto lens 10 of the fifth embodiment and an image sensor 50. The image sensor 50 may have the same or similar structure as that of the sixth embodiment. In other words, the camera module 100 of this embodiment includes the lens group of any of the first to fourth embodiment, the prism 60 of the fifth embodiment, and the image sensor 50 of the sixth embodiment.

The image sensor 50 is disposed opposite to and parallel with the emitting surface 602 of the prism 60. The image sensor 50 is configured to convert optical signals to electrical signals.

In this embodiment, a vertical distance between the stop ST and the image sensor 50 is shorter than that of the sixth embodiment, due to that the prism 60 redirects incident lights. As such, a length of the lens module 100 from a front end to a rear end is reduced, and the camera module 100 can be miniaturized.

Eighth Embodiment

Figure 20:
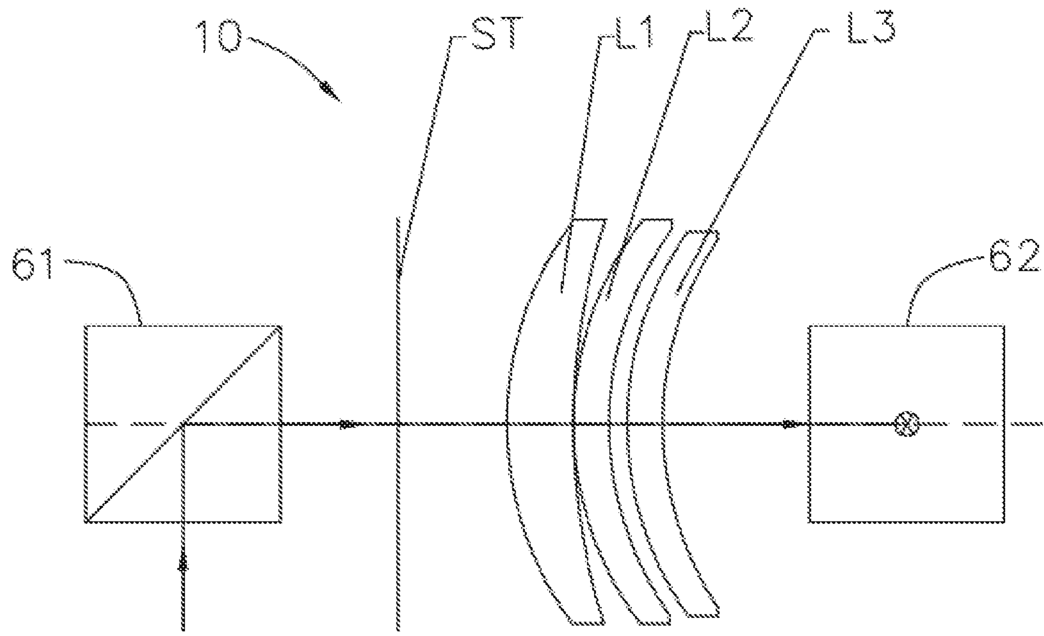
FIG. 20 is a schematic structural diagram of a camera module in an eighth embodiment of the disclosure.
Figure 21:
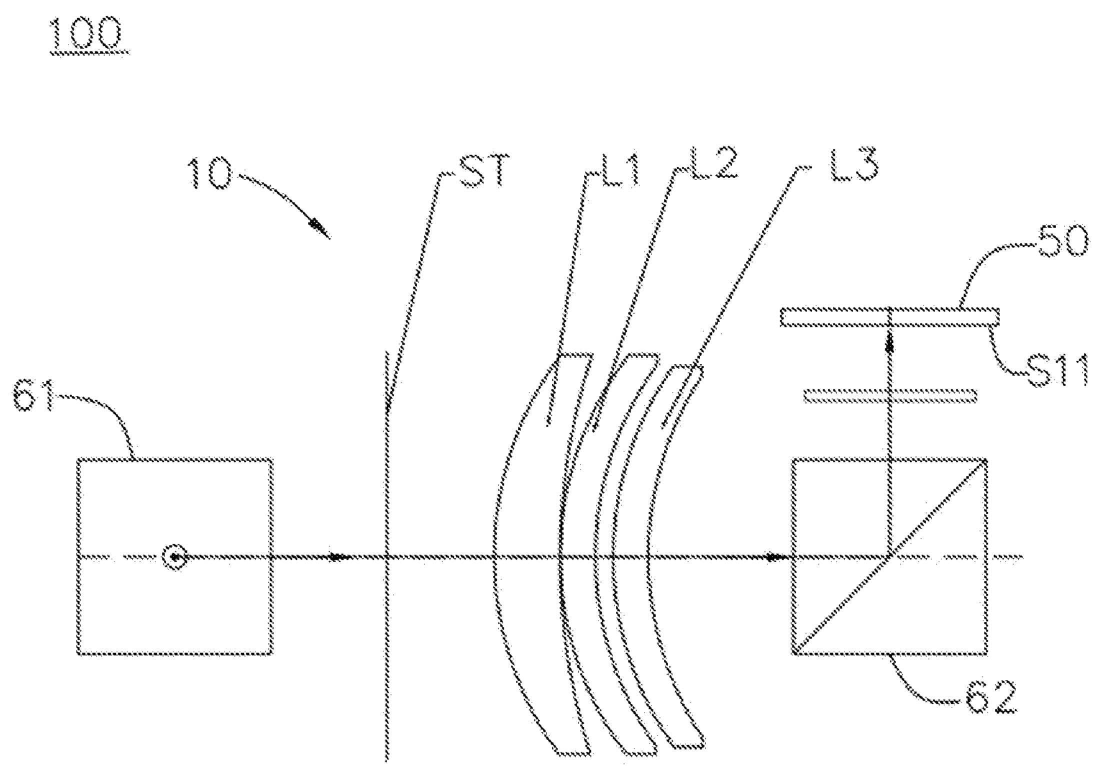
FIG. 21 is a top view of the FIG. 17.

Please refer to FIG. 20 and FIG. 21, the embodiment provides a camera module 100 including a first prism 61, a stop ST, a lens group in any of the foregoing embodiments, a second prism 62, and an image sensor 50. The lens group includes the first lens L1, the second lens L2, and the third lens L3 as any of the foregoing embodiments. The camera module 100 of this embodiment is similar to the camera module 100 of the seventh embodiment except for the addition of the first prism 61. The stop ST is disposed between the first prism 61 and the first lens L1, the second prism 62 is disposed between the third lens L3 and the image sensor 50. The first prism 61 includes a first reflective surface 613, the second prism 62 includes a second reflective surface 623, the first reflective surface 613 and the second reflective surface 623 are both intersected with an optical axis of the lens group. An included-angle of the first reflective surface 613 and the optical axis may be 45 degrees, an included-angle of the second reflective surface 623 and the optical axis may be 45 degrees. Therefore, incident lights, which are perpendicular to an optical axis of the lens group, may be redirected by the first prism 61 to a direction parallel to the optical axis of the lens group. The incident lights pass through and are refracted by the lens group. The second prism 62 redirects the incident lights to a direction perpendicular to the optical axis of the lens group.

It should be noted that, in other embodiments, the first reflective surface 613 and the second reflective surface 623 can intersect the optical axis at other angles, such as 30 degrees, 40 degrees, or any other suitable degrees as needed.

The first prism 61 is disposed at an entrance of the lens group, and the second prism 62 is disposed at an exit of the lens group, thereby designing the camera module 100 as a periscope lens imaging system (the incident lights and the exit lights are perpendicular to different planes) using reflective optical surfaces 613 and 623 of the prisms 61 and 62. In other words, a length of the lens module 100 from a front end to a rear end is reduced, and the camera module 100 can be miniaturized.

Ninth Embodiment

Figure 22:
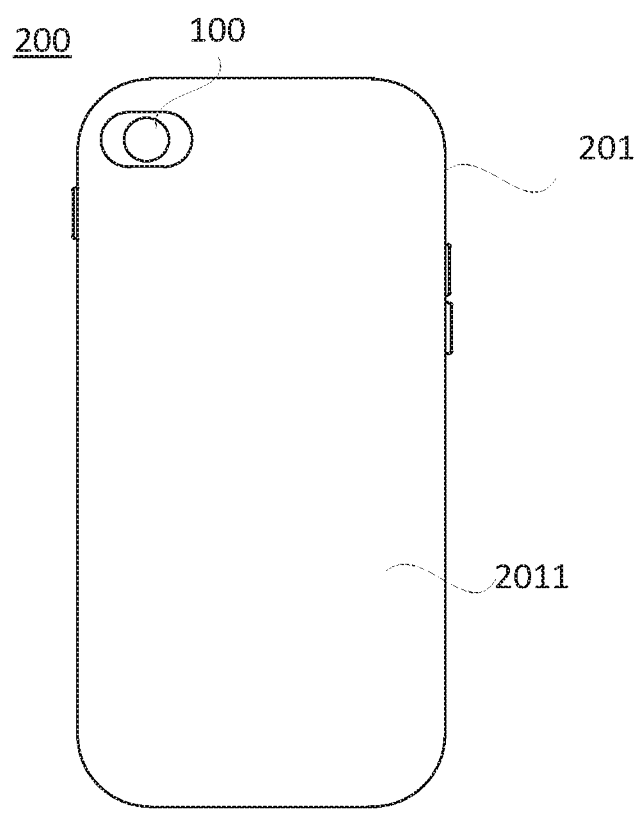
FIG. 22 is a schematic diagram of the mobile terminal according to a ninth embodiment of the disclosure.
Figure 23:
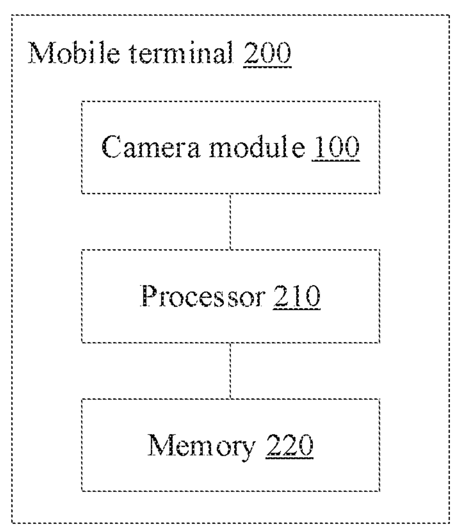
FIG. 23 is a schematic block diagram of the mobile terminal according to the ninth embodiment of the disclosure.

Please refer to FIGS. 22 and 23, the disclosure provides a mobile terminal 200. The mobile terminal 200 includes a housing 201, a processor 210, a memory 220, and the camera module 100 of the eighth embodiment. The housing 201 includes a rear cover 2011, the camera module 100 is disposed in the housing 201 and exposed from the rear cover 2011. It can be understood that the camera module 100 may also be mounted in other position of the mobile terminal 200. The processor 210 and the memory 220 are disposed in the housing 201. The camera module 100 is electrically connected with the processor 210, the processor 210 is electrically connected with the memory 220. The camera module 100 is configured to capture images, the processor 210 is configured to process the captured images, and the memory 220 is configured to store the captured images.

In other embodiments, the mobile terminal 200 may also include the camera module 100 of the sixth embodiment or the camera module 100 of the seventh embodiment.

In the disclosure, the mobile terminal 200 and the camera modules 100 each includes the telephoto lens 10, which can achieve a higher zoom ratio than a conventional telephoto lens, and can better satisfy the requirements of miniaturization and high-definition imaging of electronic products. Specifically, the flat glass G1, the prism 60, and the second prism 62 each have a high refractive index and provide a long optical path length. The flat glass G1, the prism 60, and the second prism 62 each are configured to refract lights and participate in optical imaging.

The above-mentioned embodiments are merely illustrative of several embodiments of the present disclosure, and the description thereof is more specific and detailed, however is not to be construed as limiting the scope of the disclosure. It should be noted that various variations and modifications may be made by those skilled in the art without departing from the spirit and scope of the disclosure. Therefore, the scope of the disclosure should be determined by the appended claims.

What is claimed is:

1. A telephoto lens, from an object side to an imaging surface thereof, sequentially comprising:

a stop;

a first lens having a positive refractive power, an object side surface of the first lens being convex;

a second lens having a refractive power;

a third lens having a negative refractive power, an image side surface of the third lens being concave;

a flat glass; and a filter;

wherein the flat glass meets the expression:

$$1.8<N_{d4}\leq 1.901;$$

where $N_{d4}$ represents a refractive index of the flat glass; and wherein the telephoto lens meets the expression:

$$-1<f_3/f<0;$$

where $f_3$ represents a focal length of the third lens, and f represents a focal length of the telephoto lens.

2. The telephoto lens as claimed in claim 1, wherein the telephoto lens meets the expression:

$$0.75<TTL/f<2.0;$$

where TTL represents a total optical length of the telephoto lens.

3. The telephoto lens as claimed in claim 1, wherein the telephoto lens meets the expression:

$$CT_3<CT_1;$$

where $CT_1$ represents a center thickness of the first lens, and $CT_3$ represents a center thickness of the third lens.

4. The telephoto lens as claimed in claim 1, wherein the first lens is made of glass.

5. The telephoto lens as claimed in claim 1, wherein the telephoto lens meets the expression:

$$3<f/R_1<5;$$

where $R_1$ represents a radius of curvature of the object side surface of the first lens.

6. The telephoto lens as claimed in claim 1, wherein the telephoto lens meets the expression:

$$1<R_1/R_6<2;$$

where $R_1$ represents a radius of curvature of the object side surface of the first lens, and $R_6$ represents a radius of curvature of the image side surface of the third lens.

7. The telephoto lens as claimed in claim 1, wherein the telephoto lens meets the expression:

$$CT_1+CT_2+CT_3<T_G;$$

where $CT_1$ represents a center thickness of the first lens, $CT_2$ represents a center thickness of the second lens, $CT_3$ represents a center thickness of the third lens, and $T_G$ represents a center thickness of the flat glass.

8. The telephoto lens as claimed in claim 1, wherein the telephoto lens meets the expression:

$$-5<f_2/f_1<5;$$

where $f_1$ represents a focal length of the first lens, and $f_2$ represents a focal length of the second lens.

9. The telephoto lens as claimed in claim 1, wherein the telephoto lens meets the expression:

$$-2<(R_3+R_4)/(R_3-R_4)<5;$$

where $R_3$ represents a radius of curvature of the object side surface of the second lens, and $R_4$ represents a radius of curvature of the image side surface of the second lens.

10. The telephoto lens as claimed in claim 1, wherein the telephoto lens meets the expression:

$$-2<R_4/f_2<3;$$

where $R_4$ represents a radius of curvature of the image side surface of the second lens, and $f_2$ represents a focal length of the second lens.

11. The telephoto lens as claimed in claim 1, wherein at least one of the object side surface of the first lens, an image side surface of the first lens, an object side surface of the second lens, an image side surface of the second lens, an object side surface of the third lens, and the image side surface of the third lens is an aspheric surface.

12. The telephoto lens as claimed in claim 1, wherein the first lens and the second lens are cemented into a cemented doublet.

13. The telephoto lens as claimed in claim 1, wherein the telephoto lens meets the expression:

$$f\geq 31\text{ mm}.$$

14. The telephoto lens as claimed in claim 1, wherein the telephoto lens meets the expressions:

$$D_{12}<D_{3G};\text{ and}$$

$$D_{23}<D_{3G};$$

where $D_{12}$ represents a distance between the first lens and the second lens on the optical axis, $D_{3G}$ represents a distance between the flat glass and the third lens on the optical axis, and $D_{23}$ represents a distance between the second lens and the third lens on the optical axis.

15. A telephoto lens, sequentially comprising a stop, a lens group and a prism, the lens group comprising:

a first lens having a positive refractive power, an object side surface of the first lens being convex, an image side surface of the first lens being concave;

a second lens having a refractive power, an object side surface of the second lens being convex; and a third lens having a negative refractive power, an object side surface of the third lens being convex, an image side surface of the third lens being concave;

wherein the prism comprises a reflective surface intersected with an optical axis of the lens group;

wherein the prism meets the expression:

$$1.8<N_{dp}\leq 1.901;$$

where $N_{dp}$ represents a refractive index of the prism; and wherein the telephoto lens meets the expression:

$$-1<f_3/f<0;$$

where $f_3$ represents a focal length of the third lens, and f represents a focal length of the telephoto lens.

16. The telephoto lens as claimed in claim 15, wherein the prism further comprises an incident surface and an emitting surface, the reflective surface is positioned between the incident surface and the emitting surface;

where the telephoto lens meets the expressions:

$$f\geq 31\text{ mm; and}$$

$$CT_1+CT_2+CT_3<S1+S2;$$

where $CT_1$ represents a center thickness of the first lens, $CT_2$ represents a center thickness of the second lens, $CT_3$ represents a center thickness of the third lens, S1 represents a path length from the incident surface to the reflective surface, and $5_2$ represents a path length from the reflective surface to the emitting surface.

17. The telephoto lens as claimed in claim 15, wherein the telephoto lens meets the expressions:

$$3</R_1<5;$$

$$-2<R_4/f_2<3;$$

$$-5<f_2/f_1<5;$$

$$1<R_1/R_6<2; \text{ and}$$

$$-2<(R_3+R_4)/(R_3-R_4)<5;$$

where $R_1$ represents a radius of curvature of the object side surface of the first lens, $R_4$ represents a radius of curvature of the image side surface of the second lens, $f_2$ represents a focal length of the second lens, $f_1$ represents a focal length of the first lens, $R_6$ represents a radius of curvature of the image side surface of the third lens, and $R_3$ represents a radius of curvature of the object side surface of the second lens.

18. A mobile terminal, comprising a camera module, a processor and a memory, wherein the camera module is configured to capture images, the processor is configured to process the captured images, and the memory is configured to store the captured images; the camera module comprises a telephoto lens and an image sensor coupled to the telephoto lens, from an object side to an imaging surface of the telephoto lens, the telephoto lens sequentially comprises:

a stop;

a first lens having a positive refractive power, an object side surface of the first lens being convex, an image side surface of the first lens being concave;

a second lens having a refractive power, an object side surface of the second lens being convex;

a third lens having a negative refractive power, an object side surface of the third lens being convex, an image side surface of the third lens being concave;

a prism; and a filter;

wherein the telephoto lens meets the expressions:

$$f \geq 31 \text{ mm};$$

$$1.8<N_{dp}<1.901;$$

where f represents a focal length of the telephoto lens, and $N_{dp}$ represents a refractive index of the prism; and wherein the telephoto lens meets the expression:

$$1<R_1/R_6<2;$$

where $R_1$ represents a radius of curvature of the object side surface of the first lens, and $R_6$ represents a radius of curvature of the image side surface of the third lens.

19. The mobile terminal as claimed in claim 18, wherein the telephoto lens meets the expressions:

$$CT_1+CT_2+CT_3<S1+S2;$$

$$3<f/R_1<5;$$

$$-2<R_4/f_2<3;$$

$$-1<f_3/f<0;$$

$$-5<f_2/f_1<5; \text{ and}$$

$$-2<(R_3+R_4)/(R_3-R_4)<5;$$

where $CT_1$ represents a center thickness of the first lens, $CT_2$ represents a center thickness of the second lens, $CT_3$ represents a center thickness of the third lens, S1 represents a path length from an incident surface to a reflective surface of the prism, S2 represents a path length from the reflective surface to an emitting surface of the prism, $R_4$ represents a radius of curvature of the image side surface of the second lens, $f_2$ represents a focal length of the second lens, $f_3$ represents a focal length of the third lens, $f_1$ represents a focal length of the first lens, and $R_3$ represents a radius of curvature of the object side surface of the second lens.

20. The telephoto lens as claimed in claim 19, wherein the camera module further comprises a further prism arranged in front of the stop of the telephoto lens.

* * * * *